United States Patent
Horikiri et al.

[15] 3,703,911
[45] Nov. 28, 1972

[54] REDUCING VALVE
[72] Inventors: Toshihiko Horikiri, Yokohama; Ryuta Tsuji, Inba, both of Japan
[73] Assignee: Kabushikikaisha Tokyo Keiki (Tokyo-Keike Co., Ltd.), Tokyo, Japan
[22] Filed: Feb. 23, 1971
[21] Appl. No.: 117,902

[30] Foreign Application Priority Data
March 3, 1970 Japan .................... 45/20238

[52] U.S. Cl. .................................................. 137/491
[51] Int. Cl. .................................................. G05d 16/00
[58] Field of Search ........ 137/491, 489.3, 492, 492.5, 137/488, 487, 486, 489

[56] References Cited
UNITED STATES PATENTS 2,853,096  9/1958  Lee ....................... 137/491
2,855,947  10/1958  Lee ....................... 137/489 X
3,101,738  8/1963  Horlacher ............... 137/489
1,261,607  4/1918  Peters .................... 137/488 X FOREIGN PATENTS OR APPLICATIONS
558,611  1/1944  Great Britain ............. 137/489

Primary Examiner—M. Cary Nelson
Assistant Examiner—Robert J. Miller
Attorney—Hill, Sherman, Meroni, Gross & Simpson

[57] ABSTRACT

A reducing valve having a body, inlet and outlet ports formed therein, a spool slidably inserted in the body, lower and upper covers of the body, a poppet valve formed in the upper cover of the body for adjusting the pressure of a fluid in the outlet port, and an adjusting device for adjusting the position of the spool in the body so as to prevent generation of a surge pressure in the outlet port.

7 Claims, 2 Drawing Figures

PATENTED NOV 28 1972
3,703,911
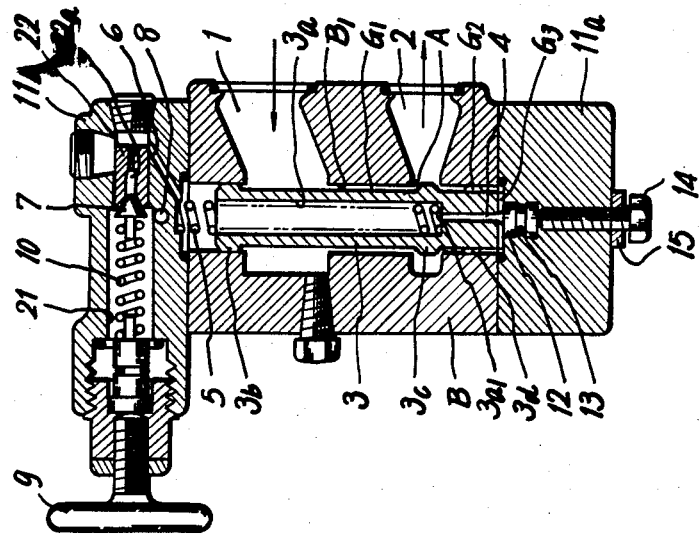
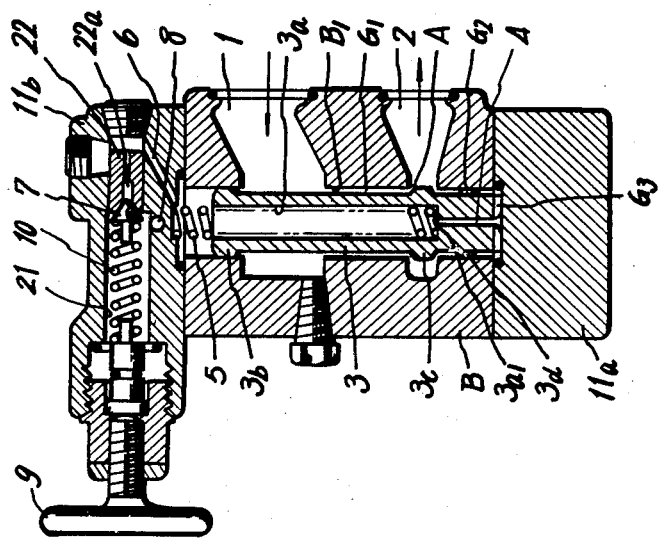
INVENTORS
Toshihiko Horikiri
Ryuto Tsuji
BY
Hill, Sherman, Meroni, Gross, Simpson
ATTYS.

REDUCING VALVE

BACKGROUND OF THE INVENTION

1. Field of the Invention

This invention relates to a reducing valve, and more particularly to a reducing valve which is provided with a device for preventing surge pressure.

2. Description of the Prior Art

A reducing valve is provided in the pipe line system for reducing the pressure of a fluid flowing therethrough down to a desired value. There are some occasions when an abnormally high pressure (the so-called surge pressure) produced in a hydraulic system instantaneously breaks instruments on the side of the load and this is the source of trouble. Various devices have heretofore been proposed for preventing the generation of such abnormally high pressure (surge pressure) but most of them are bulky and expensive and hence impractical. Recently, an accident occurred in which the metal mold of an injection machine was broken by the surge pressure generated in the oil pressure system during the molding operation thereof. However, no devices have been proposed for preventing such an accident from occurring.

SUMMARY OF THE INVENTION

Accordingly, one object of this invention is to provide a reducing valve having a device with which the throttling or choking effect of the valve is finely controlled at its starting to render its operation sensitive to thereby reduce the surge pressure.

Another object of this invention is to provide a reducing valve having a device which permits fine control of the throttling or choking effect of the valve at its starting from the outside with accuracy and is simple in construction, effective and highly practical.

Other objects, features and advantages of this invention will become apparent from the following description taken in conjunction with the accompanying drawings.

BRIEF DESCRIPTION OF THE DRAWING

FIG. 1 is a cross-sectional view of a conventional reducing valve; and

FIG. 2 is a cross-sectional view, similar to FIG. 1, showing one example of reducing valves provided with a surge pressure preventing device according to this invention.

DESCRIPTION OF THE PREFERRED EMBODIMENTS

For a better understanding of this invention, a description will be given first of a conventional reducing valve with reference to FIG. 1. In the Figure reference character B indicates the body of a reducing valve and reference numerals 1 and 2 inlet (primary) and outlet (secondary) ports for a working fluid which are formed in the valve body B. Reference numeral 3 designates a spool inserted into a bore $B_1$ formed in the valve body B, $3a$ an aperture bored in the spool 3, 4 a passage of a small diameter formed in the lower portion and leading to the aperture $3a$, and $11a$ and $11b$ respectively lower and upper covers of the valve body B. Reference numeral 5 identifies a spring interposed between the upper cover $11b$ and a lower stepped portion $3a_1$ of the aperture $3a$ in the spool 3 and the spring 5 pushes down the spool 3, namely urges it against the lower cover $11a$. The upper cover $11b$ has bored therein an aperture 21, in which a seat 22 is fixed, the seat 22 having formed therein an aperture $22a$. A poppet 7 is disposed opposite one open end of the aperture $22a$. Reference numeral 10 indicates a spring inserted into the aperture 21 for pressing the poppet 7 against the aperture $22a$ of the seat 22 and 9 a handle for adjusting the force of the spring 10 against the poppet 7. Reference numeral 6 designates an oil path formed in the upper cover $11b$ which interconnects the free open end of the aperture $22a$ of the seat 22 and the aperture $3a$ of the valve body B. Reference numeral 8 identifies an aperture bored in the upper cover $11b$ which is a kind of drain port connecting the poppet side of the aperture 21 with a tank (not shown). At the upper end portion of the spool 3 there is formed a circular projection $3b$ which makes contact with the bore $B_1$ of the valve body B at the upper portion of the inlet port 1 to prevent a pressurized fluid flowing into the inlet port 1 from flowing directly into the poppet valve chamber disposed in the upper cover $11b$. This circular projection $3b$ forms a sliding portion of the spool 3 with respect to the valve body B. A similar circular projection $3c$ is formed on the spool 3 at its lower portion. The projection $3c$ is provided at a place corresponding to the outlet port 2 in the illustrated condition, so that an orifice A is formed between the circular projection $3c$ and the upper edge portion of the outlet port 2. Further, a similar circular projection $3d$ is formed on the spool 3 at the lower end portion thereof, namely at a place opposing the wall of the bore $B_1$ below the outlet port 2 and the projection $3d$ makes sliding contact with the wall of the bore $B_1$ below the outlet port 2. With suitable selection of the inner diameter of the bore $B_1$ or the outer diameter of the spool 3, in the illustrated condition the fluid flowing into the inlet port 1 is drained out from the outlet port 2 through a gap $G_1$ defined by the spool 3 and the bore $B_1$ therebetween and, at the same time, the fluid flows into the aperture $22a$ of the seat 22 through a longitudinal groove $G_2$ formed in the projection $3d$, a lateral groove $G_3$ formed in the underside of the spool 3, the passage 4, the aperture $3a$ and the oil path 6, thereby to press the poppet 7.

The principles of the operation of such a conventional reducing valve as above described reside in that when the fluid pressure at the outlet port 2 has exceeded a predetermined value the poppet 7 is opened against the force of the spring 10 and then the fluid flowing into the poppet 7 is delivered to the tank through the outlet 8 from the gap between the poppet 7 and the seat 22 irrespective of the pressure variation in the inlet port 1. At this time, the flow of the fluid through the passage 4 of the small inner diameter causes a pressure difference between the upper and lower portions of the spool 3 through the passage 4. Namely, the fluid pressure acting on the underside of the spool 3 is greater than that acting on its upper portion, so that the spool 3 is moved up against the spring 5 to narrow the orifice A defined between the circular projection $3c$ of the spool 3 and the upper edge of the outlet port 2 of the valve body B and similarly cause a great decrease in the fluid pressure between the inlet and outlet ports 1 and 2. That is, the fluid pressure at the outlet port 2 becomes far lower than that at the inlet port 1. Thus, the fluid pressure at the outlet port 2 is held at the predetermined value.

In the foregoing, the pressure difference between the upper and lower portions of the spool 3 for holding the spool 3 at its pressure reduction control position is caused by the flow rate of the fluid flowing through the passage 4 of small aperture. However, while the reducing valve is in its normal operative condition, the poppet 7 is held in contact with the seat 22, so that no fluid flows through the passage 4 and the spool 3 is not moved. Therefore, there is no possibility that the orifice A is completely closed to render the reducing valve inoperative.

It is said that the fluid pressure difference between the inlet and outlet ports is generally required to exceed 10 kg/cm$^2$ for favorable operation of the reducing valve.

We have carefully examined by an oscillograph the phenomenon that the surge pressure was produced at the outlet port 2 of the reducing valve. As a result of this, it has been clarified that the surge pressure is caused by an improper opening of the orifice A and a time lag due to dull operation of the spool 3.

Accordingly, the present invention resides in a reducing valve provided with a device by which the operating distance of the spool 3 is previously shortened according to the flow rate of the working fluid and the opening of the orifice A is accurately adjusted at the starting of the valve taking note of suitable adjustment of the opening of the orifice A.

With reference to FIG. 2 one example of this invention will hereinbelow be described in detail. In the figure reference numerals and characters corresponding to those in FIG. 1 designate similar elements. Their constructions and operations are substantially the same as those described with FIG. 1, and hence no detailed description will be repeated.

Reference numeral 12 designates a piston which is inserted in the lower cover 11a of the reducing valve and contacted with the lower end surface of the spool 3 for adjusting the opening of the orifice A. Reference numeral 13 indicates a packing such as O-shaped ring provided at the intermediate portion of the piston 12, 14 an adjustment screw for the piston 12 the upper end of which adjustment screw 14 engages with the lower end of the piston 12 and the lower end portion of which adjustment screw 14 projects out from the lower cover 11a and 15a lock nut of the adjustment screw 14.

A description will be given of the operation of this invention depicted in FIG. 2.

The piston 12 is moved up a suitable distance by turning the adjustment screw 14 from the outside of the reducing valve so that the opening of the orifice A may be of a suitable value at the starting of the operation of the reducing valve in accordance with the flow rate of the working fluid as previously described, and then the adjustment screw 14 and consequently the piston 12 is fixed by clamping the lock nut 15.

Since the distance of movement of the spool 3 is previously shortened, the opening of the orifice A is previously made small in advance. Therefore, the time for the movement of the spool 3, namely for changing the orifice until the pressure of the reducing valve reaches a predetermined value is short. Accordingly, the response of the reducing valve of this invention is very rapid.

In our experiment conducted with a synthetic resin injection molding machine employing the reducing valve of this invention in which a pressure of 140 kg/cm$^2$ was reduced down to 50 kg/cm$^2$, a surge pressure of 120 kg/cm$^2$ generated on the side of the outlet port 2 in an injection molding machine using a conventional reducing valve could be reduced to about 65 kg/cm$^2$ and the metal mold was not broken.

In the foregoing the opening of the orifice A is previously made small but the same results could be obtained even by previous suitable selection of the opening of the orifice A with the use of the screw 14 according to the flow rate of the working fluid.

The foregoing example has been described eo employ the piston 12 but it will be seen that if the screw 14 itself is sealed and its free end is urged against the underside of the spool 3, the piston 12 and the O-ring 13 can be omitted.

With an attachment of a simple additional device and its adjustment from the outside of the reducing valve, the present invention readily prevents generation of the surge pressure without fail, and hence is highly practical and can be widely used for various purposes.

It will be apparent that many modifications and variations may be effected without departing from the scope of the novel concepts of this invention.

We claim as our invention

1. A reducing valve comprising a body having an inlet port and an outlet port formed therein, a spool slidably received in the body and movable from a first position providing a flow passage interconnecting said ports to a second position blocking flow between said ports, means biasing the spool to the first position, means for applying the fluid pressure at the outlet port against opposite ends of the spool, valve means for releasing the fluid pressure applied against one end of the spool to cause the spool to move toward said second position to restrict flow between said ports, and adjustable means for varying the position of the spool in said first position to vary the size of the flow passage and to prevent generation of a surge pressure of the fluid in the outlet port.

2. A reducing valve according to claim 1, wherein said adjustable means is a screw threaded into said body having one end making contact with the other end of the spool as the spool assumes the first position.

3. A reducing valve according to claim 1, wherein said adjustable means is a screw threaded into said body engaging a piston disposed in the body for adjusting the axial position of the piston in said body, said piston engaging said spool to determine the axial position of the spool in the body as it assumes the first position.

4. A reducing valve according to claim 3, wherein the piston has provided thereon an O-ring.

5. A reducing valve according to claim 3, wherein the screw has a lock nut for locking the screw in a predetermined position in said body.

6. A reducing valve comprising a body, inlet and outlet ports formed therein, a spool slidably inserted in the body, a lower cover of the body, an upper cover of the body, a valve provided in the upper cover for adjusting the pressure of a fluid at the outlet port, and means for adjusting the position of the spool so as to prevent generation of a surge pressure of the fluid in the outlet port, said means for adjusting the position of the spool consisting of a screw screwed into the lower cover and a piston having provided thereon an O-ring and inserted into the lower cover, the upper end of the piston making contact with the underside of the spool and one end of the screw making contact with the lower end of the piston, the position of the spool being adjusted through the piston by adjusting the screw.

7. A reducing valve as claimed in claim 6 wherein the screw has a lock nut for locking the screw at a predetermined position.

* * * * *